Dec. 22, 1964      E. BRIEN      3,162,165

SALVAGE SYSTEM

Filed Aug. 10, 1961      2 Sheets-Sheet 1

INVENTOR

Edith Brien.

Dec. 22, 1964     E. BRIEN     3,162,165
SALVAGE SYSTEM

Filed Aug. 10, 1961     2 Sheets-Sheet 2

INVENTOR
Edith Brien.

United States Patent Office 3,162,165
Patented Dec. 22, 1964

3,162,165
SALVAGE SYSTEM
Edith Brien, % Canadian Research & Development Foundation, 1437 Van Horne Ave., Montreal, Quebec, Canada
Filed Aug. 10, 1961, Ser. No. 130,549
3 Claims. (Cl. 114—54)

This invention relates to improvements in marine salvage systems suitable for raising sunken vessels or the like and more particularly to improvements in salvage systems utilizing inflatable bags.

It is conventional practice, during marine salvage operations, to utilize surface vessels having mounted thereon numerous derricks and pumps, in addition to depth sounding, diving and welding gear and the like. A common disadvantage to salvage systems currently in use is that divers are required for the initial attachment of rigging means to the submerged vessel, which may be impractical and dangerous to the diving personnel, should the vessel be lying in exceptionally deep or treacherous water.

It should be further noted that, if the depth of water is in excess of a safe limit for divers, salvage operations must be abandoned, due to the fact that under water welding could not be carried out and other necessary tasks such as attaching air pipes or the like to the sunken vessel could not be effected.

It is an object of this invention to provide a salvage system wherein the services of a diver would not be required for the initial attachment of the components thereof to a sunken vessel.

It is another object of the present invention to provide a salvage system requiring much less complicated and less expensive equipment than systems of the prior art.

It is another object of this invention to provide a salvage system which may be attached to a sunken ship or other object, in such numbers that the sunken vessel or other object may be raised to safe working limits for the permanent attachment of lifting or towing cables thereto.

It is yet another object of this invention to provide a salvage system which may be utilized at greater depths than systems currently in use.

It is a further object of this invention to provide a salvage system embodying a combination of electromagnets and collapsible inflatable bags of resilient material which may be utilized in any convenient ratio and deployment to provide the most efficient combination for each particular salvage job.

It is still further an object of this invention to provide a salvage system, wherein the attachment of the electromagnets to the sunken vessel or object to be raised will be clearly indicated to the salvage tender by an alarm system.

It is yet another object of this invention to provide a salvage system wherein the collapsible inflatable bags are provided with a safety valve or release device incorporated in the inflating system of such design as to maintain a safe working pressure within the bag under various conditions of external pressure to be encountered at varying depths.

It is yet another object of this invention to provide a salvage system comprising a plurality of inflatable bags, wherein the inflation of such bags may be accomplished by remotely externally located inflation means, or by attached bottle means of frozen or liquefied gas.

It is yet another object of this invention to provide a salvage system comprising a plurality of collapsible inflatable bags which may be partioned in such a way as to prevent total loss of buoyancy of any particular bag, should it become damaged, thereby reducing to a minimum shock due to buoyancy loss and preventing the loss of a device to the bottom.

These and other objects and features of this invention will become apparent when taken in conjunction with the accompanying drawings in which.

Figures 3, 4:
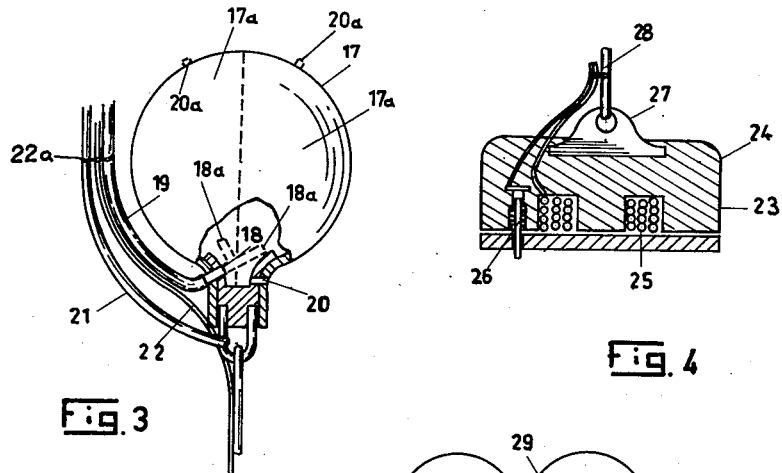

FIG. 3 is a sectional side elevation, in exaggerated proportion, of an inflatable bag embodied in the present invention indicating a method of attaching the air inlet and relief valves to the inflatable bags, and the location of the lowering cable, electrical cable, air hose and anchor chain thereto. It also illustrates in dotted detail one modification of said bag to provide for separate, airtight compartments therewithin.

FIG. 4 is a fractional, sectional view of an electromagnet embodied in the present invention utilized for attachment of the inflatable bag to the sunken vessel.

Figure 5:
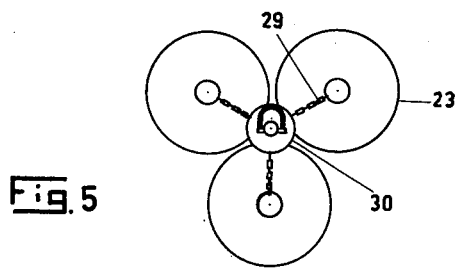

FIG. 5 illustrates a cluster of the electromagnets as illustrated in FIG. 4, showing particularly the method of attaching these to a common lifting ring.

Figure 2:
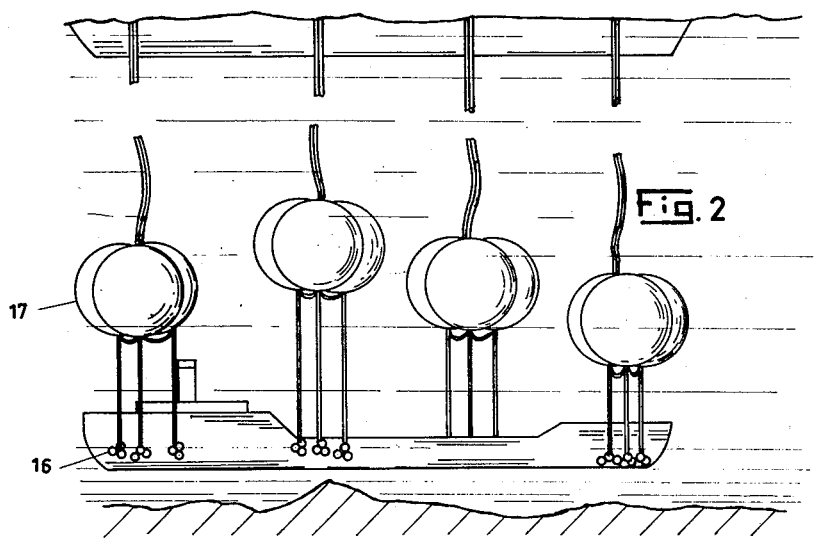
FIG. 2 illustrates the components of the salvage system illustrated in FIG. 1 attached to the sunken vessel, the inflatable bags filled with air or the like and the sunken vessel raised clear of the sea bed for the purpose of making permanent attachment of lifting or towing cables thereto.
Figure 6:
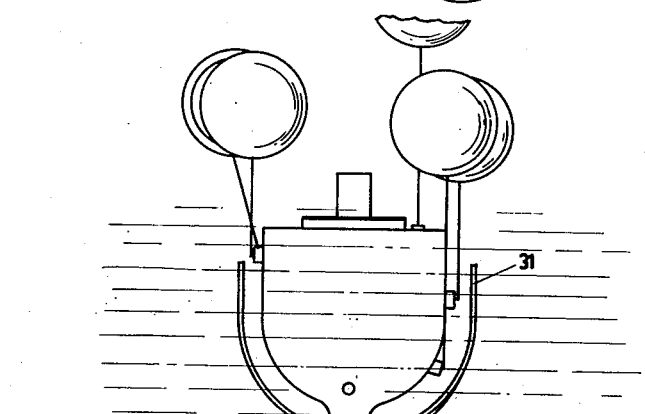

FIG. 6 is an end on view of the components of the salvage system as shown in FIG. 2, after permanent cables have been placed around the sunken vessel.

Figure 1:
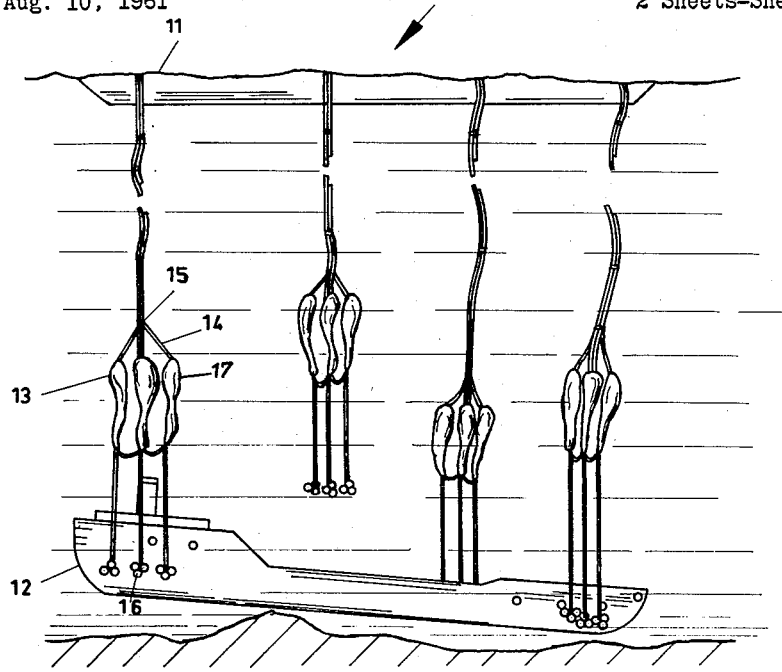
FIG. 1 is a diagrammatic sketch illustrating a salvage system embodying the present invention, in which a plurality of groups of deflated inflatable bags, together with their associated clusters of electromagnets are positioned for attachment to a sunken vessel, or are in the process of being lowered from the salvage tender.

Referring to FIG. 1, a salvage system indicated generally by arrow 10, is carried by a salvage tender 11 which, having located a submerged vessel 12 by echo sounder or other means, proceeds to lower over the side thereof one or more units 13 of salvage system 10.

Each unit 13 comprises a plurality of inflatable, pliant balloon-like bags 17 retained in relative position to each other, by tie means 14 to a common point 15. Units 13 are attached to a cluster of powerful electromagnets 16 by cable or other means.

Referring to FIGS. 1 and 2, upon a plurality of magnet clusters 16 having been affixed to the submerged vessel 12, the inflatable bags 17 are expanded as required by the introduction of compressed air thereinto, supplied from pumps located on salvage tender 11, their buoyancy being proportional of the water displaced to their inflated size.

Referring to FIG. 3, a bag 17 of unit 13 as illustrated in FIGS. 1 and 2, is inflated through an air inlet valve 18, air being supplied thereto by means of an air hose 19 extending from salvage tender 11. Each bag 17 is provided with a relief valve 20 adapted to maintain safe pressure limits therewithin thereby preventing its rupture in any depth of water.

Each bag 17 may be internally subdivided as shown in dotted detail to form two or more independently airtight compartments 17a therewithin. Compartments 17a are supplied by air under pressure from a plurality of inlet valves 18a interconnected to air hose 19. Each compartment 17a is also equipped with a relief valve 20a to prevent rupturing thereof due to expansion of air therein due to the increase in pressure differential upon said bag 17 rising from deep to shallow water.

A comparatively light lowering cable 21 and an electrical cable 22 are secured adjacent to each other to bag 17, by suitable clamp means 22a, which also serves to hold cables 21 and 22 clear of, and prevent damage to, bag 17.

Referring to FIG. 4, a single electromagnet 23 illustrated sectionally, comprises a soft iron housing 24, of substantially circular disc like configuration containing therein a plurality of electromagnets or electromagnetic coils 25 of substantially similar characteristics. An externally operable, momentary contact switch 26 of the normally open circuit variety, is adapted to extend outwardly of housing 24 in such a manner as to be made to close upon housing 24 becoming properly affixed to the submerged vessel 12, thereby indicating to the personnel aboard salvage tender 11 which magnets 23 are in correct operating position.

A cable ring 27 is attached to housing 24, permitting the fastening thereto of lowering cable 21 and a heavy hoisting cable 28.

Referring to FIG. 5, a plurality of electromagnets 23 as illustrated in FIG. 4 is indicated, showing their position relative to each other and the method whereby they may remain as a group, held together by a chain 29 extending from each of said magnets 23 to a common ring block 30.

Referring to FIG. 6, upon a plurality of magnet clusters 16 attaching themselves to the steel hull of a sunken vessel 12, and after inflation of bags 17, the vessel 12 is caused to rise slowly from the ocean floor permitting a plurality of lifting cables 31 to be placed around it. Vessel 12 may then be towed into dry dock or worked on in shallow water, in greater ease and safety than in its previous location, in order to exhaust sufficient water from within the hull to make the ship buoyant.

It will be noted that, although each bag 17 is described as being inflated by air pumps located on salvage tender 11, this inflation could be effected by the adaptation of liquid carbon dioxide bottles attached to each individual bag 17, triggered to operate electrically by a hydrostatic device or by manual means from tender 11. This method having the advantages that less capital equipment is required on board the salvage tender 11 although it would be suitable only for the salvage of smaller vessels.

The general design of the individual parts of the invention as explained above may be varied according to the requirements in regard to manufacture and production thereof, while still remaining within the spirit and principle of the invention, without prejudicing the novelty thereof.

The embodiments of this invention in which an exclusive property or privilege is claimed are defined as follows:

1. A salvage system for the raising of sunken vessels including magnet means, said magnet means providing the sole means of attachment to said sunken vessel; inflatable bags attached to said magnet means and means for the lowering and raising of said said magnet means.

2. A salvage system for the raising of sunken vessels including magnet means; said magnet means providing the sole means of attachment to said sunken vessel; said magnet means being electromagnets; said magnet means being operable upon said magnet means being lowered to contact said sunken vessel; inflatable bags attached to said magnet means whereby buoyancy is provided; and means for the lowering and raising of said magnet means.

3. A salvage system for the raising of sunken vessels including magnet means; said magnet means providing the sole means of attachment to said sunken vessel; said magnet means being electromagnets; said magnet means being in clusters; said magnet means being operable upon said magnet means being lowered to contact said sunken vessel; inflatable bag means attached to said magnet means whereby buoyancy is provided; said inflatable bag means being in clusters; each of said inflatable bag means being subdivided to form a plurality of independently airtight compartments; valve means in each of said compartments, said valve means being operable upon the pressure in said compartments exceeding a selected point; compressed air supply hose means providing each of said compartments with compressed air; and means for the raising and lowering of said magnets.

References Cited in the file of this patent
UNITED STATES PATENTS

| | | |
|---|---|---|
| 1,321,383 | Matter | Nov. 11, 1919 |
| 1,321,562 | Sisson | Nov. 11, 1919 |
| 1,332,433 | Deam | Mar. 2, 1920 |
| 1,388,363 | Miller | Aug. 23, 1921 |
| 2,687,541 | Bannister | Aug. 31, 1954 |
| 2,892,434 | Ralleo | June 30, 1959 |
| 2,939,416 | Calabrese | June 7, 1960 |
| 3,080,844 | Lehmann | Mar. 12, 1963 |

FOREIGN PATENTS

| | | |
|---|---|---|
| 510,058 | Italy | Jan. 19, 1955 |